(12) United States Patent
Inagaki

(10) Patent No.: US 11,698,761 B2
(45) Date of Patent: Jul. 11, 2023

(54) PRINTER, NON-TRANSITORY COMPUTER-READABLE RECORDING MEDIUM, AND INFORMATION PROCESSING SYSTEM, FOR DETERMINING A NUMBER OF PRINT MEDIA PRINTABLE WITH A RECHARGEABLE BATTERY

(71) Applicant: SATO HOLDINGS KABUSHIKI KAISHA, Tokyo (JP)

(72) Inventor: Kazuyuki Inagaki, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/414,539

(22) PCT Filed: Nov. 25, 2019

(86) PCT No.: PCT/JP2019/045906
§ 371 (c)(1),
(2) Date: Jun. 16, 2021

(87) PCT Pub. No.: WO2020/137295
PCT Pub. Date: Jul. 2, 2020

(65) Prior Publication Data
US 2022/0075568 A1    Mar. 10, 2022

(30) Foreign Application Priority Data
Dec. 27, 2018 (JP) ................................ 2018-244793

(51) Int. Cl.
G06F 3/12 (2006.01)

(52) U.S. Cl.
CPC .......... *G06F 3/1204* (2013.01); *G06F 3/1219* (2013.01); *G06F 3/1221* (2013.01); *G06F 3/1232* (2013.01); *G06F 3/1255* (2013.01)

(58) Field of Classification Search
CPC .... G06F 3/1221; G06F 3/1284; G06F 3/1218; G06F 3/1219; G06F 3/1273; G06F 1/28;
(Continued)

(56) References Cited

U.S. PATENT DOCUMENTS 10,261,564 B1 * 4/2019 Gollakota ............. G06F 1/3212
2002/0033872 A1 * 3/2002 Takahashi ................ B41J 29/38
347/171

(Continued)

FOREIGN PATENT DOCUMENTS

JP    10-207585 A    8/1998
JP    11-339771 A    12/1999
(Continued)

OTHER PUBLICATIONS

European Search Report, Application No. 19901760.9, dated Jan. 24, 2022, 9 pages.
(Continued)

*Primary Examiner* — Juan M Guillermety
(74) *Attorney, Agent, or Firm* — Foley & Lardner LLP

(57) ABSTRACT

A printer for issuing a print medium includes: a rechargeable battery configured to supply power to the printer; a printing part configured to print information on the print medium; a controller configured to determine a number of print media on which the printing part can print with present remaining battery capacity of the battery, based on information related to variation of remaining battery capacity of the battery relative to a number of print media that have been issued.

9 Claims, 11 Drawing Sheets

(58) Field of Classification Search
CPC .... G06F 3/1204; G06F 3/1232; G06F 3/1255; G06F 3/1203; G06F 3/1229; B41J 29/393; B41J 2029/3932; B41J 2/32; B41J 29/38; B41J 29/46
See application file for complete search history.

(56) References Cited

U.S. PATENT DOCUMENTS

| | | | |
|---|---|---|---|
| 2006/0007461 A1* | 1/2006 | Ferlitsch | G06F 3/1284 358/1.14 |
| 2006/0164674 A1* | 7/2006 | Someno | G03G 15/80 358/1.14 |
| 2007/0229875 A1* | 10/2007 | Suzuki | G06K 15/00 358/1.14 |
| 2012/0185191 A1* | 7/2012 | Sugaya | G06F 1/28 702/63 |
| 2014/0028246 A1 | 1/2014 | Martynowski et al. | |

FOREIGN PATENT DOCUMENTS

| | | |
|---|---|---|
| JP | 2004-195806 A | 7/2004 |
| JP | 2005-343084 A | 12/2005 |
| JP | 2007-283604 A | 11/2007 |
| JP | 2010-058292 A | 3/2010 |
| JP | 2011-198134 A | 10/2011 |
| JP | 2012-65166 A | 3/2012 |
| JP | 2013-203012 A | 10/2013 |
| JP | 2014-168939 A | 9/2014 |
| JP | 2015-107564 A | 6/2015 |
| WO | WO-2011/148702 A1 | 12/2011 |
| WO | WO 2012/56032 A1 | 5/2012 |

OTHER PUBLICATIONS

Japanese Office Action and English translation, Japanese Application No. 2018-244793, dated Jul. 12, 2022.

* cited by examiner

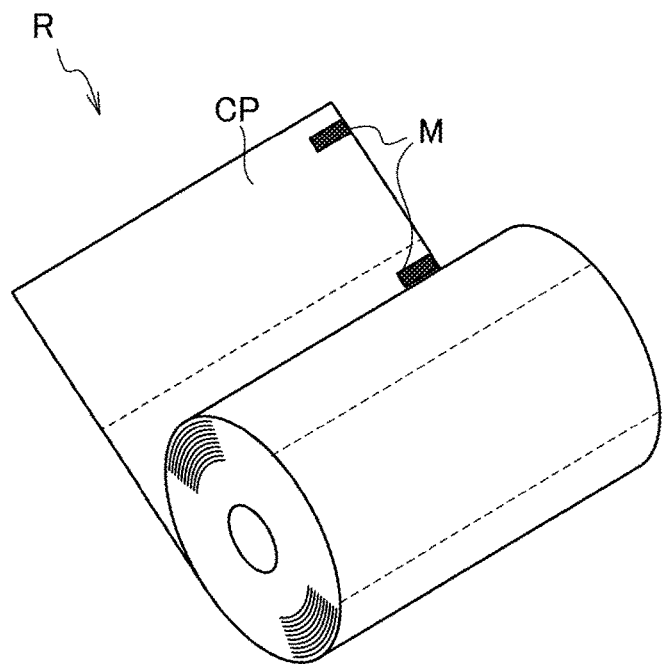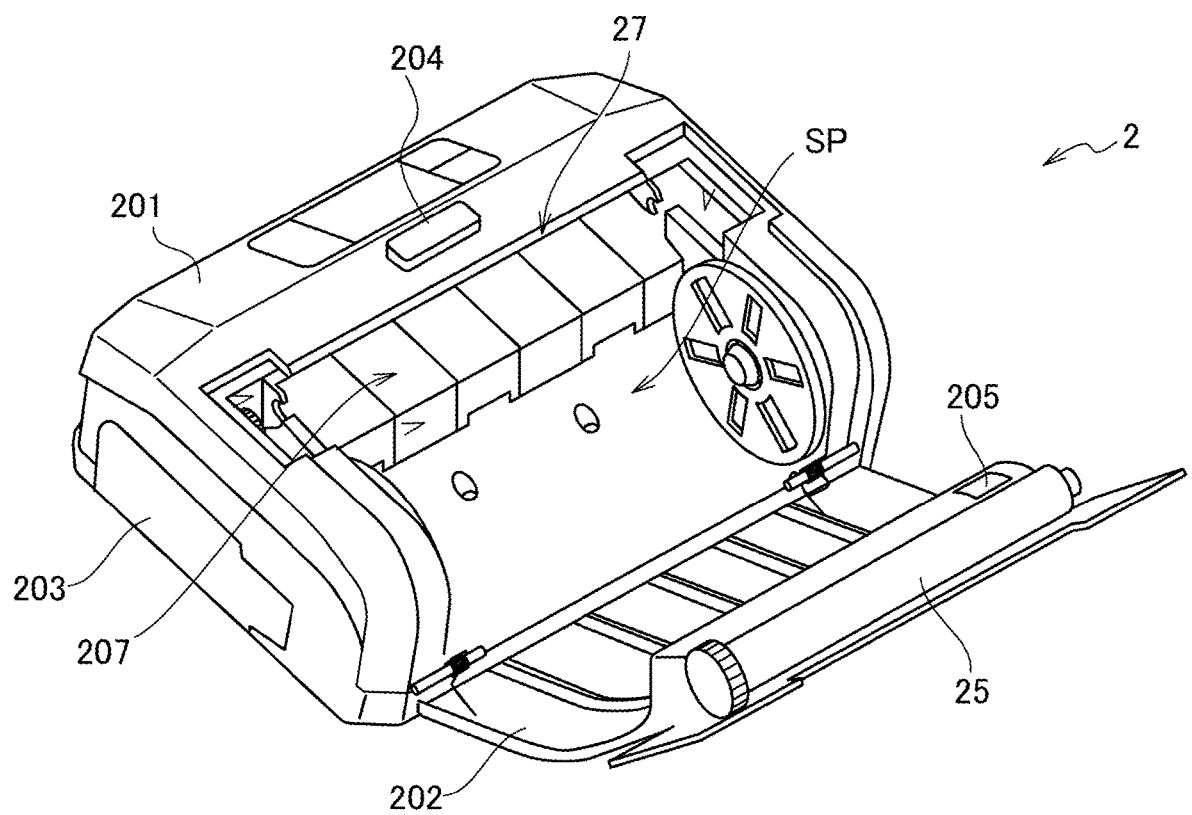
FIG.2

Battery Information

■ Number of Battery Charging
54 times
・Fast Charging : 21 times
・Slow Charging : 33 times ■ State of Health of Battery

| good | caution | swap |

■ Maximum Temperature Exposure for Battery

25°C — 55°C

■ Log Factor
1.2

← A1

■ Overall Safety Level for Battery

State of Health
90%
Number of Battery charging
1 — 500
60%

■ Message for Battery
・Battery is healthy now.
・Continue usage to date.

85 forms
printable with present remaining battery capacity

| Printer ID | | Cumulative number of platen roller rotations | Battery status information | | | | | Date |
|---|---|---|---|---|---|---|---|---|
| | | | Number of Battery charging | Maximum temperature | SOC | SOH | Recovery rate | ...... | |
| A001 | Previous values | 13459 | 82 | 45°C | 80% | 75% | 0.95 | ........ | 2018/12/3 |
| | Present values | 13520 | 83 | 45°C | 65% | 73% | 0.94 | ........ | 2018/12/4 |
| B002 | Previous values | ...... | ...... | ...... | ...... | ...... | ...... | ...... | ...... |
| | Present values | ...... | ...... | ...... | ...... | ...... | ...... | ...... | ...... |
| C003 | Previous values | ...... | ...... | ...... | ...... | ...... | ...... | ...... | ...... |
| | Present values | ...... | ...... | ...... | ...... | ...... | ...... | ...... | ...... |

Printer database

FIG.10

PRINTER, NON-TRANSITORY COMPUTER-READABLE RECORDING MEDIUM, AND INFORMATION PROCESSING SYSTEM, FOR DETERMINING A NUMBER OF PRINT MEDIA PRINTABLE WITH A RECHARGEABLE BATTERY

TECHNICAL FIELD

A present disclosure relates to a printer, a program, and an information processing system.

BACKGROUND ART

In recent years, a rechargeable battery (also referred to as a secondary battery) such as a lithium-ion battery has been applied to a relatively small printer (see Japanese Laid-open patent publication 2010-58292 for example).

SUMMARY OF THE INVENTION

Problems to be Solved by the Invention

While a user brings outside a printer having a rechargeable battery and uses the printer outside, power of the battery is consumed as the printer issues print media such as business forms. Consequently, the user may have a worry about print quality deterioration of the print media or incapability of issuing a print medium due to too low remaining battery capacity.

In view of the above, the present invention aims to preliminarily notify a user of a number of print media on which a printer equipped with a rechargeable battery is able to print.

Means for Solving the Problems

An embodiment according to the present invention is a printer for issuing a print medium, comprising: a rechargeable battery configured to supply power to the printer; a printing part configured to print information on the print medium; a controller configured to determine a number of print media on which the printing part can print with present remaining battery capacity of the battery, based on information related to variation of remaining battery capacity of the battery relative to a number of print media that have been issued.

Effects of the Invention

The embodiment according to the present invention is capable of preliminarily notifying a user of a number of print media on which a printer equipped with a rechargeable battery is able to print.

BRIEF DESCRIPTION OF THE DRAWINGS

FIG. 2 is a perspective view of the printer with its cover opened according to the first embodiment.

FIG. 7 shows a print example by the printer according to the first embodiment.

FIG. 10 shows an example of a printer database in the information processing system according to the second embodiment.

DETAILED DESCRIPTION OF THE INVENTION

The present invention relates to a Japanese patent application No. 2018-244793 filed on Dec. 27, 2018 with the Japan Patent Office, entire content of which is incorporated into this specification by reference.

In the following description, "remaining battery capacity" has substantially the same meaning as level of charge or state of charge (SOC). Remaining battery capacity indicates 100% when a battery is fully charged, and 0% when the battery is fully discharged.

"Information related to variation of remaining battery capacity of a battery relative to a number of print media that have been issued" may be, for example, information related to variation of remaining battery capacity varied or decreased by issuing a predetermined number (one or ten, for example) of print media, or may be information related to a decrease rate in remaining battery capacity of the battery relative to a number of print media that have been issued.

Figure 1:
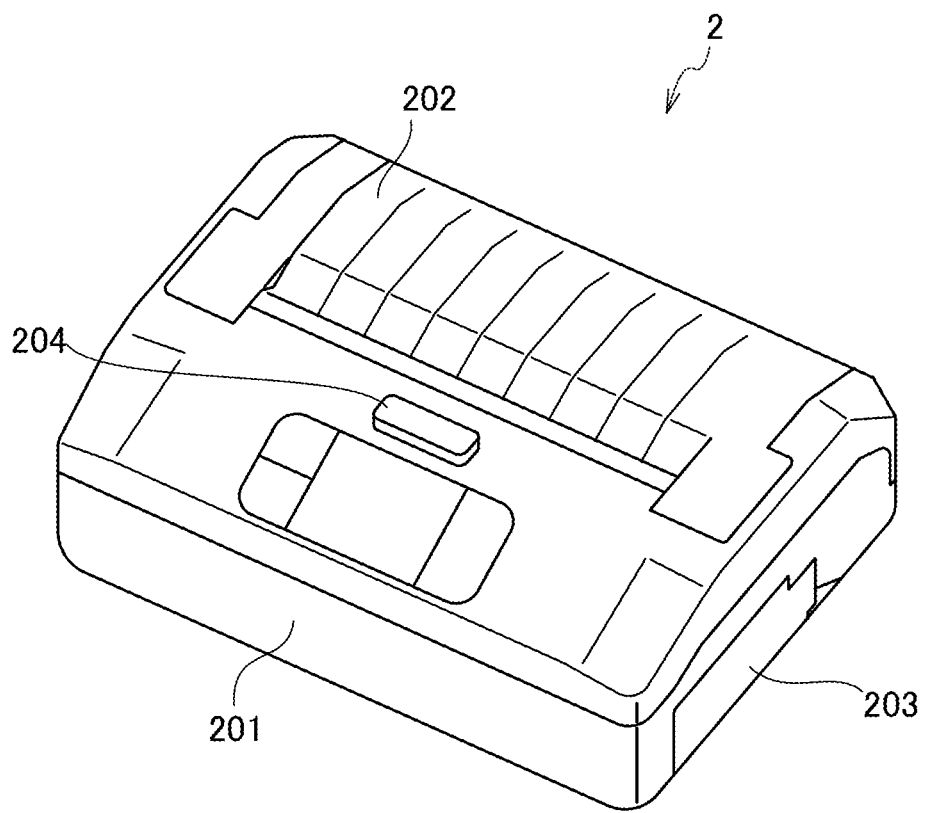
FIG. 1 is a perspective view of a printer with its cover closed according to a first embodiment.
Figure 3:
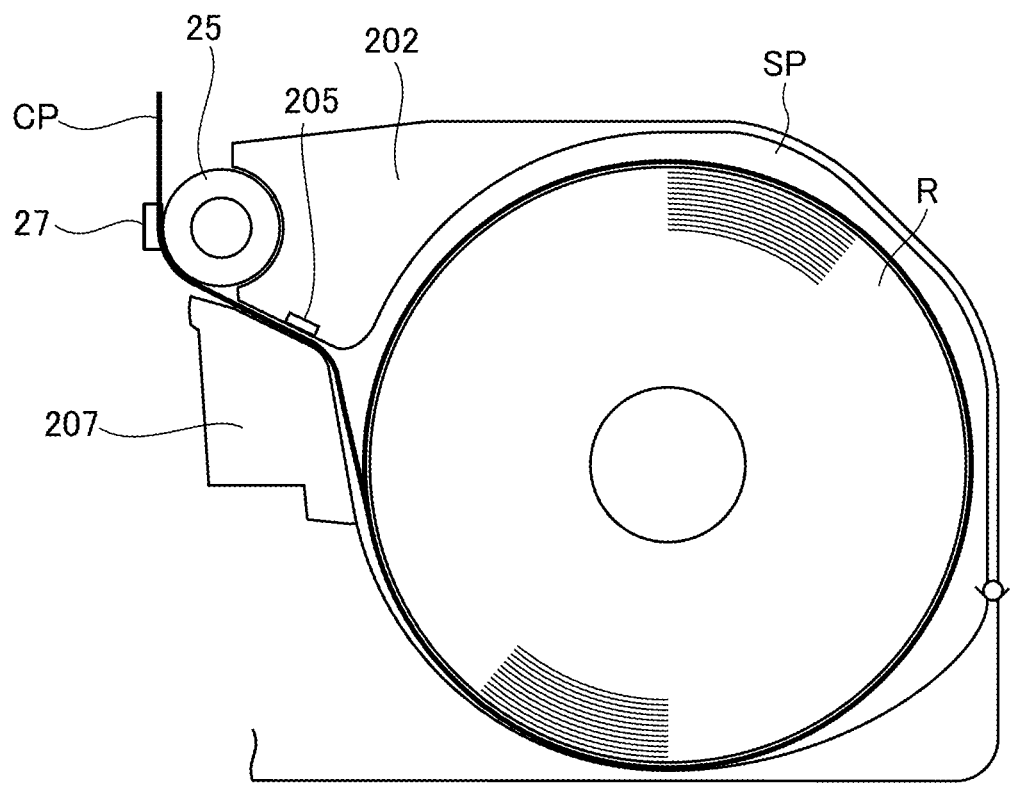
FIG. 3 is a partial sectional view of the printer according to the first embodiment to show a feeding path.

(1) First Embodiment (1-1) Overview of Configuration of Printer According to the Embodiment First, overview of configuration of a printer according to the present embodiment will be described with reference to FIGS. 1 to 3. FIG. 1 is a perspective view of a printer 2 with its cover closed. FIG. 2 is a perspective view of the printer 2 with its cover opened. FIG. 3 is a partial sectional view of the printer 2 to show a feeding path in the printer 2.

The printer 2 is, for example, a mobile small-sized printer and operates with power of a battery. The battery is a secondary battery such as a lithium-ion battery.

As illustrated in FIG. 1, the printer 2 is a mobile printer that has a flat cuboid shape, for example. A user may use the printer 2 with transverse posture, or may use the printer 2 with a belt hook (not illustrated) or a shoulder belt (not illustrated) equipped. Non-limiting applications of the printer 2 includes a case in which a delivery person of a package uses the printer 2 to issue, at a receiver's address, a printed business form such as a receipt or a delivery absence notice.

A period in which the printer 2 is activated is assumed to include an operation period and a non-operation period. The operation period is a period in which a user carries the printer 2, which has been detached from a charger, and intermittently issues a business form as a print medium. The non-operation period is a period in which a business is not issued. In the case described above for example, the "operation period" corresponds to a period of time beginning from a time when a delivery person detaches the printer 2 from a charger after arriving for work at a delivery center and starts delivery of packages with the printer 2, and ending at a time when the delivery person returns to the delivery center after completing the delivery of the packages and connects the printer 2 to the charger. The "non-operation period" corresponds to a period of time in which the printer 2 is connected to the charger. That is, the "non-operation period" is a period other than the operation period. The battery of the printer 2 is charged during the non-operation period.

The exemplary printer 2 shown in FIGS. 1 and 2 has a body case 201 and a cover 202. As illustrated in FIG. 2, an end of the cover 202 is pivotally supported to the body case 201 with a hinge. The end of the cover 202 is structured so that the cover 202 is swingable in a direction away from and in a direction toward the body case 201. Pushing a button 204 causes the cover 202 to open, and a container SP is opened. The container SP is space in which a paper roll R, which is illustrated in FIG. 2, for example, is contained.

The paper roll R is made by winding a belt-shaped long strip of continuous paper CP into a roll shape. The paper roll R is stored (loaded) in the container SP in a drop-in manner when the cover 202 is open. In an example of the present embodiment, the paper roll R does not have a core, and is therefore made by winding the belt-shaped continuous paper CP so that a cylindrical hollow part with a predetermined diameter is formed.

A heat-sensitive color developing layer is formed on a print face of the continuous paper CP. The layer's color develops when temperature of the layer reaches a predetermined temperature range.

A location detection marks M are provided on the rear side of the print face of the continuous paper CP, in a longitudinal direction, to indicate a print reference position of each business form. The location detection marks M are rectangular marks printed in black on the rear side of the print face of the continuous paper CP, and are formed with predetermined intervals.

A battery cover 203 is attached to one side of the body case 201 in a openable and closable manner. The battery cover 203 opens or closes a batter housing in which a battery B (illustrated in FIG. 4) is contained.

A platen roller 25 is pivotally supported at the front end of the cover 202 so that the platen roller 25 can rotate in a forward direction and a reverse direction. The platen roller 25 is a feed roller configured to feed the continuous paper CP extracted from the paper roll R. The platen roller 25 extends in the width direction of the continuous paper CP. The platen roller 25 is formed to extend along a width direction of the continuous paper CP. The platen roller 25 is driven by a motor 24 (illustrated in FIG. 4) via a gear, etc.

As illustrated in FIG. 2, a sensor 205 is disposed on a portion of the cover 202 in the vicinity of the platen roller 25. More specifically, the sensor 205 is disposed on a surface of the cover 202 facing a feeding path when the cover 202 is closed. The sensor 205 is configured to detect a reference position of the business form (namely, the location detection mark M of the continuous paper CP). The sensor 205 is a reflective type optical sensor.

FIG. 3 shows a feeding path in a bold line when the paper roll R is contained in the container SP. In FIG. 3, the paper roll R is made by winding the continuous paper CP counterclockwise.

As shown in FIG. 3, when the cover 202 is closed, a portion of the cover 202 and a portion of a feed guide 207 are opposed with a slight gap. The gap forms a feeding path of the continuous paper CP, which is extracted from the paper roll R, directing from the container SP toward the platen roller 25. Note that the sensor 205, which is disposed at the cover 202, is opposed to the feeding path, in order to detect the location detection marks M of the continuous paper CP that passes through the feeding path.

With the continuous paper CP pinched between the platen roller 25 and a thermal head 27, the printer 2 prints on the respective business forms. Printing on the respective business forms is timed based on detection of the location detection marks M by the sensor 205 for example.

(1-2) Internal Configuration of Printer According to the Embodiment

Figure 4:
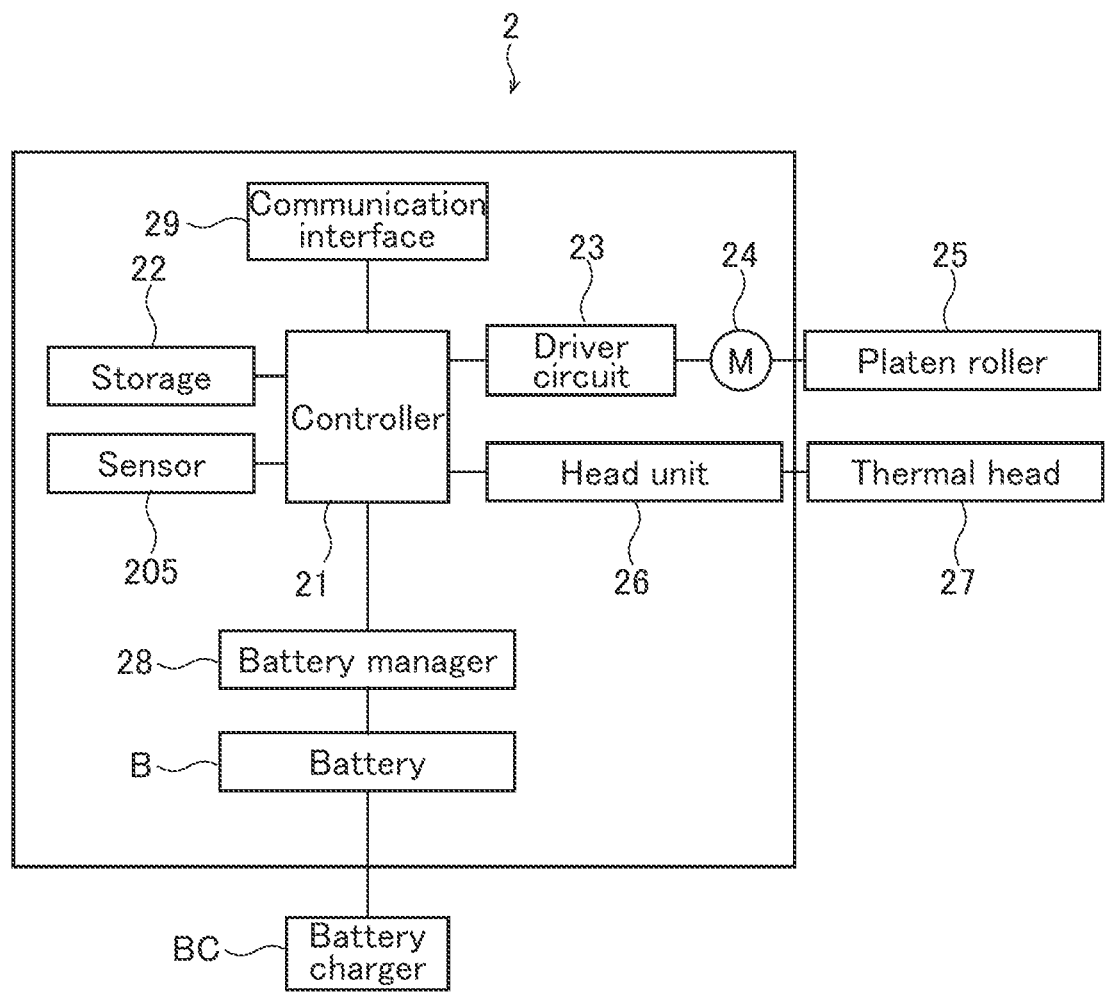
FIG. 4 is a block diagram to represent an internal configuration of the printer according to the first embodiment.

Next, an internal configuration of the printer 2 will be described with reference to FIG. 4. FIG. 4 is a block diagram to represent an internal configuration of the printer 2.

As shown in FIG. 4, the printer 2 includes: for example, a controller 21; a storage 22; a driver circuit 23; the motor 24 which is mechanically connected to the platen roller 25; a head unit 26 that drives the thermal head 27; a battery manager 28; a communication interface (I/F) 29; the sensor 205; and the battery B. The communication interface 29 (exemplary communication part and exemplary first communication part) employs a communication circuit to communicate with an outside device.

The battery manager 28 may be integrated into the battery B. Note that the head unit 26 and the thermal head 27 function as a printing part.

The controller 21 is comprised of a microcomputer and memories (namely, a random access memory (RAM) and a read-only memory (ROM)) to control operations of the printer 2. The microcomputer loads a firmware from the ROM when the printer 2 is powered on, and executes the firmware.

Execution of the firmware causes the controller 21 to function as print instruction means for instructing to print predetermined information on a business form.

Execution of the firmware causes the controller 21 to function as determining means for determining a number of business forms on which the printer can print with present remaining battery capacity of the battery B, based on information related to variation of remaining battery capacity of the battery B relative to a number of business forms that have been issued.

The storage 22 is a storage device such as a solid state drive (SDD). The storage 22 may store information of print format(s) applied when information is printed on each business form, in addition to print data to be printed on each business form. A cumulative number of rotations of the platen roller 25 (namely, a cumulative number of platen roller rotations) is stored in the storage 22. The cumulative number of platen roller rotations is sequentially updated by the controller 21.

The driver circuit 23 is a circuit that drives the motor 24 for controlling rotation of the platen roller 25, responsive to a feed request form the controller 21. The motor 24 is a stepping motor, for example. The feed request includes, for example, information about a feed direction (namely, a forward direction or a reverse direction) and a feed amount (a number of steps, etc.).

The head unit 26 includes a circuit that causes current to selectively flow through each of a plurality of heating elements of the thermal head 27, based on each line data of print data transmitted from the controller 21. When heating elements heated by the current are pushed to the continuous paper CP fed by the platen roller 25, a color develops at a part of the continuous paper to which the heating elements are pushed, thereby printing information on the continuous paper CP.

The battery manager 28 includes, for example, a voltage sensor, a current sensor, a temperature sensor, and a control circuit. The control circuit is configured to process detection signals from the sensors to compute and record battery status information of the battery B. The voltage sensor is configured to detect a voltage between terminals of the battery B. The temperature sensor may be attached to the battery B, or may be disposed in the vicinity of the battery B. The temperature sensor is configured to detect a temperature of the battery B. The current sensor is disposed on a line connected to one terminal of the battery B to detect current that flows in the line (namely, current that flows through the battery B).

The battery manager 28 transmits the battery status information of the battery B, responsive to an instruction from the controller 21, or at a predetermined time.

The battery status information of the battery B, which is managed by the battery manager 28, may include, but not limited to:

a number of charging to the battery B (namely, a number of fast charging and a number of slow charging);
temperature-exposure history of the battery B
one of, or a combination of estimate values including state of charge (SOC), state of power (SOP), state of health (SOH; namely, indicator of battery degradation), a capacity recovery rate, and an internal resistance of the battery B The battery B can be recharged when a user connects the both terminals of the battery B in the printer 2, to a charger BC. For example, the charger BC is connected to commercial power supply such as 100V AC power supply with which to charge the battery B.

Functions that are realized by execution of the firmware in the controller 21 may include at least the following functions (i) to (iv):

(i) Obtaining battery status information of the battery B;
(ii) Updating a cumulative number of platen roller rotations;
(iii) Determining a number of platen roller rotations for printing a single business form; and
(iv) Computing a number-of-forms-issuable (that is, a number of business forms on which the printer can print with remaining battery capacity of the battery B).

(1-3) Principle of Computing a Number-of-Forms-Issuable

Figure 5:
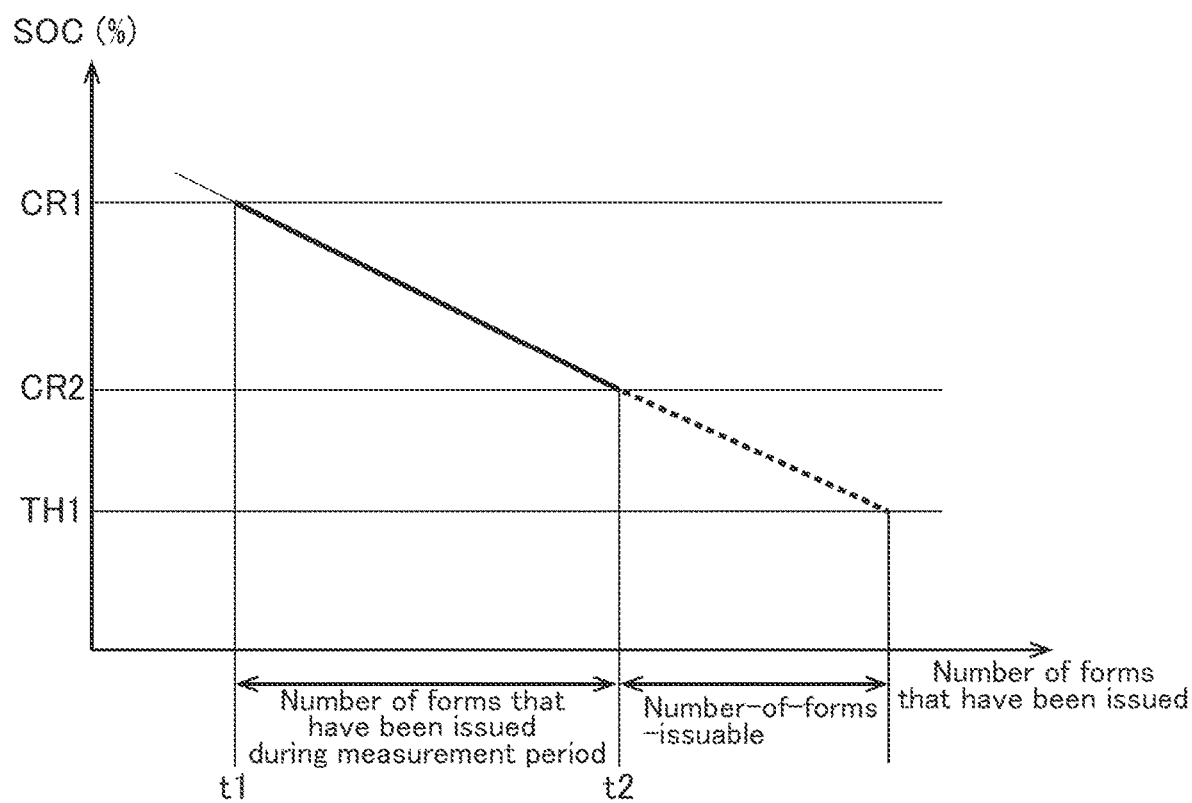
FIG. 5 shows a method for computing a number-of-forms-issuable.

Next, a principle of computing a number-of-forms-issuable with remaining battery capacity at a time in the printer 2 according to the present embodiment, will be explained. FIG. 5 shows a method for computing a number-of-forms-issuable.

FIG. 5 shows a relation between a number of business forms that have been issued by the printer 2 and SOC (%) (namely, remaining battery capacity) of the battery B. As shown in FIG. 5, as the printer 2 issues a business form, power is consumed, thereby reducing the remaining battery capacity of the battery B in the printer 2. Thus, a number-of-forms-issuable with the remaining battery capacity of the battery B varies (decreases) from time to time. Note that FIG. 5 applies approximation, assuming that a relation between the number-of-forms-issuable and the SOC of the battery B is linear.

When the printer 2 is not charged, for example, not in an operation period (the aforementioned "operation period"), a period which starts at a time t1 (referred to as "measurement start time") and ends at a time t2 (referred to as "measurement end time") is set. The time t2 corresponds to one when a number-of-forms-issuable of the business forms is computed.

The controller 21 of the printer 2 computes a decrease rate of remaining battery capacity of the battery B relative to business forms that have been issued, based on a decreased amount of the remaining battery capacity of the battery B during the period from the time t1 to the time t2, and a number of business forms that have been issued during the period. That is, the controller 21 computes a decreased amount of the remaining battery capacity of the battery B for issuing a single business form.

In FIG. 5, it is assumed that SOC or a charge amount at the time t1 is CR1 and that SOC or a charge amount at the time t2 is CR2. It is also assumed that a threshold of a lower limit of the SOC of the battery B is TH1. If the SOC of the battery B decreases to the threshold TH1, then the battery B needs to be charged by the charger BC. The threshold TH1 may be set to be 40% to 50% in light of a long-life of the battery B, for example.

In a case in which a stepping motor is used in the printer 2, for example, a number of business forms that have been issued during the period from the time t1 to the time t2, may be computed in a method described below.

First, a diameter D of the platen roller 25 is known. Next, a number of pulses n2 that have been actually applied for printing, is divided by a number of pulses n1 of the stepping motor for a single rotation of the platen roller 25, to find a number of rotations (n2/n1) of the stepping motor during a period of time in which business forms have been fed. That is, a feed amount of the business forms in printing can be found by πD*(n2/n1).

The feed amount of business forms in printing can be computed; however, in a case of continuous issuance, a number of business forms that have been issued cannot be counted.

In view of the above, the sensor 205 transmits to the controller 21, a detection signal indicating that the sensor 205 has detected the location detection mark M. The location detection mark M is formed with predetermined intervals on the rear face of the continuous paper CP to indicate a positon of each business form. Incidentally, a number of pulses n3 of the stepping motor for feeding a distance between adjoining location detection marks M, can be detected. Thus, the number of pulses n2 that have been actually applied for printing, is divided by n3, to enable to count the number of business forms that have been issued (n2/n3).

Base on the number of business forms that have been issued during the period from the time t1 to the time t2, and the SOC or the charge amount, a decrease rate (or amount) (that is, a decrease amount of the remaining battery capacity of the battery B for issuing a signal business form) can be found.

Note that, as the diameter of the platen roller 25 decreases as it wears in use, a feed amount of the continuous paper CP by a single pulse of the stepping motor also decreases. Thus, the number of business forms that have been issued, computed later in life of the platen roller, will slightly deviate from that computed at the start of use of the platen roller. Nevertheless, such deviation can be limited by processing broken numbers, such as rounding off fractions.

Referring to FIG. 5, a decrease rate Rb of the remaining battery capacity of the battery B relative to the number of business forms that have been issued, is found by the following equation (1) for example. In the equation (1), a value of (CR1−CR2) corresponds to a variation of the remaining battery capacity.

$$Rb = \frac{(CR1 - CR2)}{\left(\frac{N}{n}\right)} \quad (1)$$

A number-of-forms-issuable PLn is found by the following equation (2) for example. The number-of-forms-issuable PLn is a number of business forms that can be issued during a period of time in which the SOC varies from CR2 at the time t2 to the threshold TH1.

$$PLn = \frac{(CR2 - TH1)}{(CR1 - CR2)} \cdot \left(\frac{N}{n}\right) \quad (2)$$

As described above, a number-of-forms-issuable of the business forms can be computed.

It should be noted that, a time when the number-of-forms-issuable is computed, is not limited. For example, computation of the number-of-forms-issuable may be triggered by an input performed by a user to the printer 2 while the printer 2 is in the operation period.

Additionally, the measurement start time t1 is not limited. For example, the measurement start time t1 may be a time when the printer 2 is detached from the charger BC to start the operation period of the printer 2, or may be a time when a user performs an input to the printer 2 during the operation period of the printer 2.

As described above, based on a variation of the SOC of the battery B during a measurement period from the measurement start time to the measurement end time, the controller 21 computes a decrease rate of the SOC during the measurement period. The measurement period is within the operation period in which the printer 2 is not connected to the charger BC. Based on the decrease rate, the controller 21 then computes the number-of-forms-issuable of the business forms with remaining battery capacity of the battery B at the present time.

Note that the measurement end time may not necessarily coincide with the present time (that is, a time when the number-of-forms-issuable is computed). As long as the measurement end time in the operation period has elapsed and the decrease rate of the SOC has been computed, the number-of-forms-issuable may be able to be computed at any time after the measurement end time.

(1-4) Exemplary Behavior of Printer According to the Embodiment

Next, an exemplary behavior of the printer 2 according to the present embodiment will be described with reference to FIGS. 6 and 7.

Figure 6:
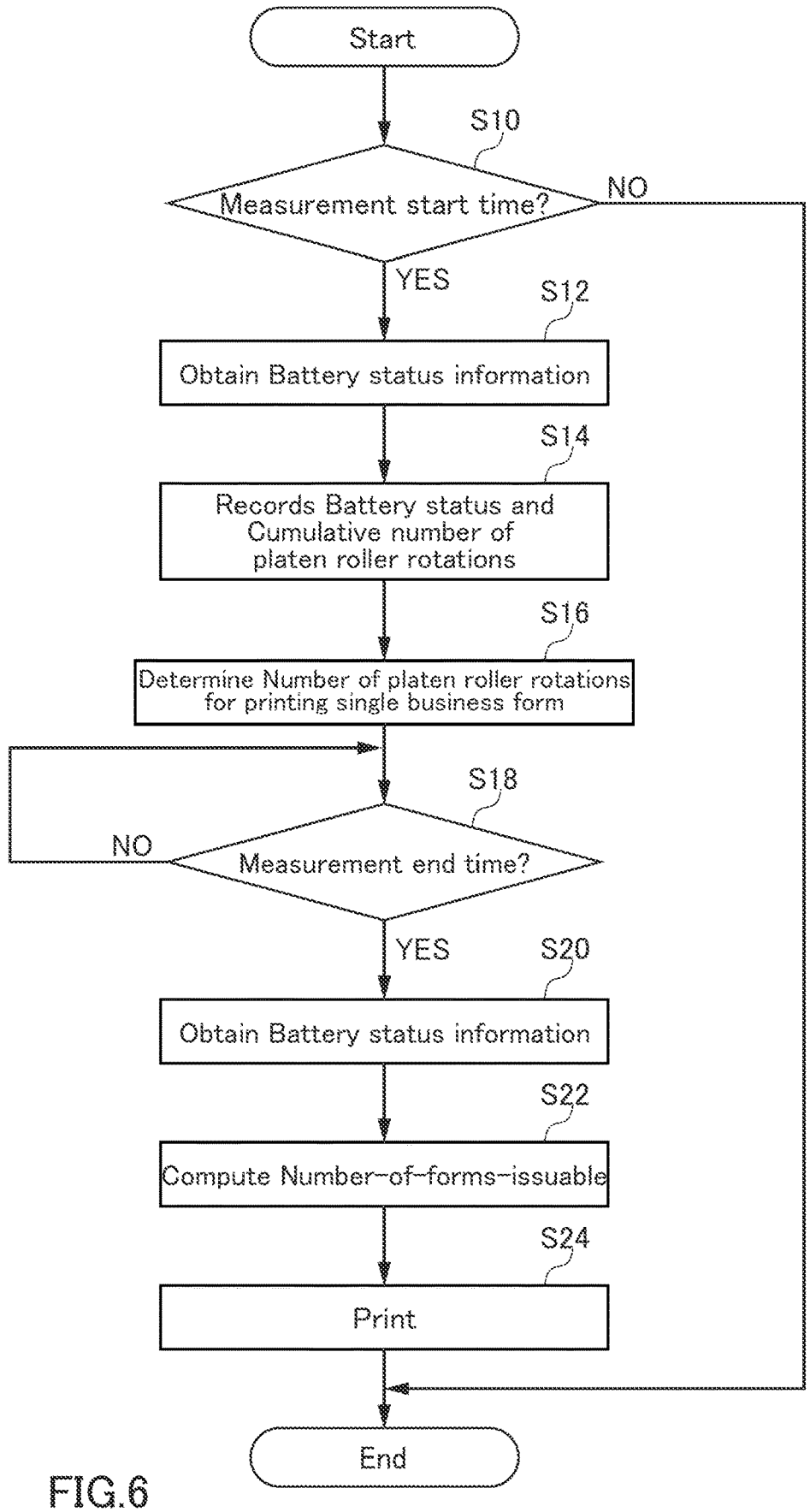
FIG. 6 is a flowchart of instructions performed by the printer according to the first embodiment.

FIG. 6 is a flowchart showing a sequence of instructions performed by the printer 2. The flowchart shown in FIG. 6 is mainly executed by the controller 21 of the printer 2. FIG. 7 shows a print example by the printer 2.

In the flowchart of FIG. 6, the controller 21 obtains battery status information of the battery B from the battery manager 28 at the measurement start time (step S10: YES, step S12), and records the obtained battery status information of the battery B and a cumulative number of platen roller rotations, in the RAM for example (step S14). The battery status information of the battery B includes at least information related to SOC of the battery B.

The controller 21 then determines a number of platen roller rotations for printing a single business form, based on a detection result of the sensor 205 (step S16).

The controller 21 obtains battery status information of the battery B from the battery manager 28 at the measurement end time (step S18: YES, step S20). The status battery information of the battery B includes at least information related to SOC of the battery B.

The controller 21 then computes a number-of-forms-issuable in accordance with the equation (2) described above (step S22). That is, the controller 21 reads out the SOC (corresponding to CR1 in FIG. 5) of the battery B and the cumulative number of platen roller rotations, which have been recorded at the step S14. Based on: the data that have been read out; the SOC (corresponding to CR2 in FIG. 5) of the battery B, which have been obtained at the step S20; a cumulative number of platen roller rotations at the present time; and a threshold (corresponding to Till in FIG. 5), which is a fixed parameter, the controller 21 computes the number-of-forms-issuable in accordance with the equation (2) described above.

According to an example of the present embodiment, the controller 21 is configured to print information related to the number-of-forms-issuable (step S24). A print example of such information is illustrated in FIG. 7.

FIG. 7 shows a preferable example in which the information related to the number-of-forms-issuable is printed on a print region A2 and information of the battery B is printed on a print region A1.

In the example of FIG. 7, "85 forms", which is printed on the print region A2, is a value of the number-of-forms-issuable, which has been computed at the step S22.

Printed on the print region A1 in the example of FIG. 7 are pieces of information related to items including: "Number of Battery Charging"; "State of Health of Battery"; "Maximum Temperature Exposure for Battery"; "Log Factor"; "Overall Safety Level for Battery"; and "Present Comment for Battery." Note that information for all items may not be necessarily printed on the print region A1, and that a piece of information corresponding to at least one of items may be printed on the print region A1.

Information corresponding to respective items are as follows.

"Number of Battery Charging" is information that indicates a total number of battery charging. If a number of fast charging and a number of slow charging are separately counted, then "Number of Battery Charging" indicates each number of charging. In this case, the number of battery charging is counted every time the battery manager 28 charges the battery. Since battery deterioration proceeds as the number of battery charging increases, the number of battery charging is an indicator of battery deterioration.

"State of Health of Battery", which corresponds to SOH of the battery, is a factor indicating health condition (or status of health) of the battery. The SOH is represented by a ratio of present battery capacity relative to initial battery capacity, or by a ratio of the present internal resistance relative to an initial internal resistance of the battery. In FIG. 7, one of three levels ("good", "caution", and "swap") is indicated by an arrow as "State of Health of Battery" based on the SOH.

"Maximum Temperature Exposure for Battery", indicated by an arrow, corresponds to a maximum temperature under which the battery has exposed to date. The battery manager 28 records a history of temperature of the battery. Based on the history of temperature of the battery, the battery manager 28 transmits data related to the maximum temperature, to the controller 21.

"Log Factor" corresponds to an inverted value of a capacity recovery rate of the battery. The greater "Log Factor" indicates, the further battery deterioration proceeds.

"Overall Safety Level for Battery" is information of the battery that is indicated on a graph. In the graph, the number of battery charging is indicated in a horizontal axis, while the state of health (SOH) is indicated in a vertical axis.

"Message for Battery" is text information for present battery status, which has been determined in accordance with certain criteria based on information of respective items described above.

In order to print the information included in the print region A1 of FIG. 7 at the step S24, the controller 21 obtains from the battery manager 28 at the step S20, in addition to the SOC of the battery, information related to a number of battery charging, and a temperature history of the battery B, SOH, a capacity recovery rate, a resistance of the battery.

Printing the battery information, as shown in the print region A1 of FIG. 7 as an example, allows a user to recognize present status of the battery B.

With reference to FIGS. 6 and 7, a case has been described that information related to the number-of-forms-issuable is printed; however, the present invention is not limited to this case. If the printer 2 is equipped with a display, then the controller 21 may be configured to display the information related to the number-of-forms-issuable on the display, thereby notifying a user of the information.

If the printer 2 is capable of communicating with other information terminal (as an example of "external device") having a display, such as a handy terminal, then the controller 21 may transmit the information related to the computed number-of-forms-issuable to the information terminal, and the information terminal may display the information related to the number-of-forms-issuable.

As described above, the measurement start time and the measurement end time are not limited. For example, as shown in FIG. 6, the measurement start time and the measurement end time may be set to be a start time and an end time of the operation period of the printer 2 respectively.

For example, the measurement start time may correspond to a time when a user detaches the printer 2 from the charger BC after arriving for work at a delivery center and goes out with the printer 2. In this case, the controller 21 of the printer 2 recognizes the measurement start time by detecting disconnection between the battery B and the charger BC. The measurement end time may correspond to a time when the user returns to the delivery center and connects the printer 2 to the charger BC before leaving. In this case, the controller 21 of the printer 2 recognizes the measurement end time by detecting connection between the battery B and the charger BC.

In this example, the user is able to recognize the number-of-forms-issuable of the printer 2 when returning to the delivery center and connecting the printer 2 to the charger BC. Thus, useless charging may be prevented, depending on the number-of-forms-issuable.

In other example, the measurement start time and the measurement end time may be set to be a start time of the operation period and a time when a user performs a predetermined manipulation, respectively.

For example, a user perform the predetermined manipulation at a desired time while using the printer 2 outside. Then, the controller 21 of the printer 2 recognizes the measurement end time, and prints or displays a number-of-forms-issuable. Since, in this example, the user can recognize the number-of-forms-issuable at a desired time while using the printer 2 (that is, in the operation period), the user may take necessary actions. Such actions may include returning to the delivery center to replace the printer 2 or the battery when the number-of-forms-issuable is small, for example.

(2) Second Embodiment

Next, an information processing system of the second embodiment according to the present invention will be described with reference to FIGS. 8 to 11.

In the information processing system of the second embodiment, a plurality of printers is connected to a server through a network, and information of each printer of the plurality of printers is centrally managed by the server. While it has been described in the first embodiment that computation of a number-of-forms-issuable is executed by the printer 2, the server, in the second embodiment, is configured to compute a number-of-forms-issuable of each printer and to notify each printer of the number-of-forms-issuable.

(2-1) Configuration of Information Processing System

Figure 8:
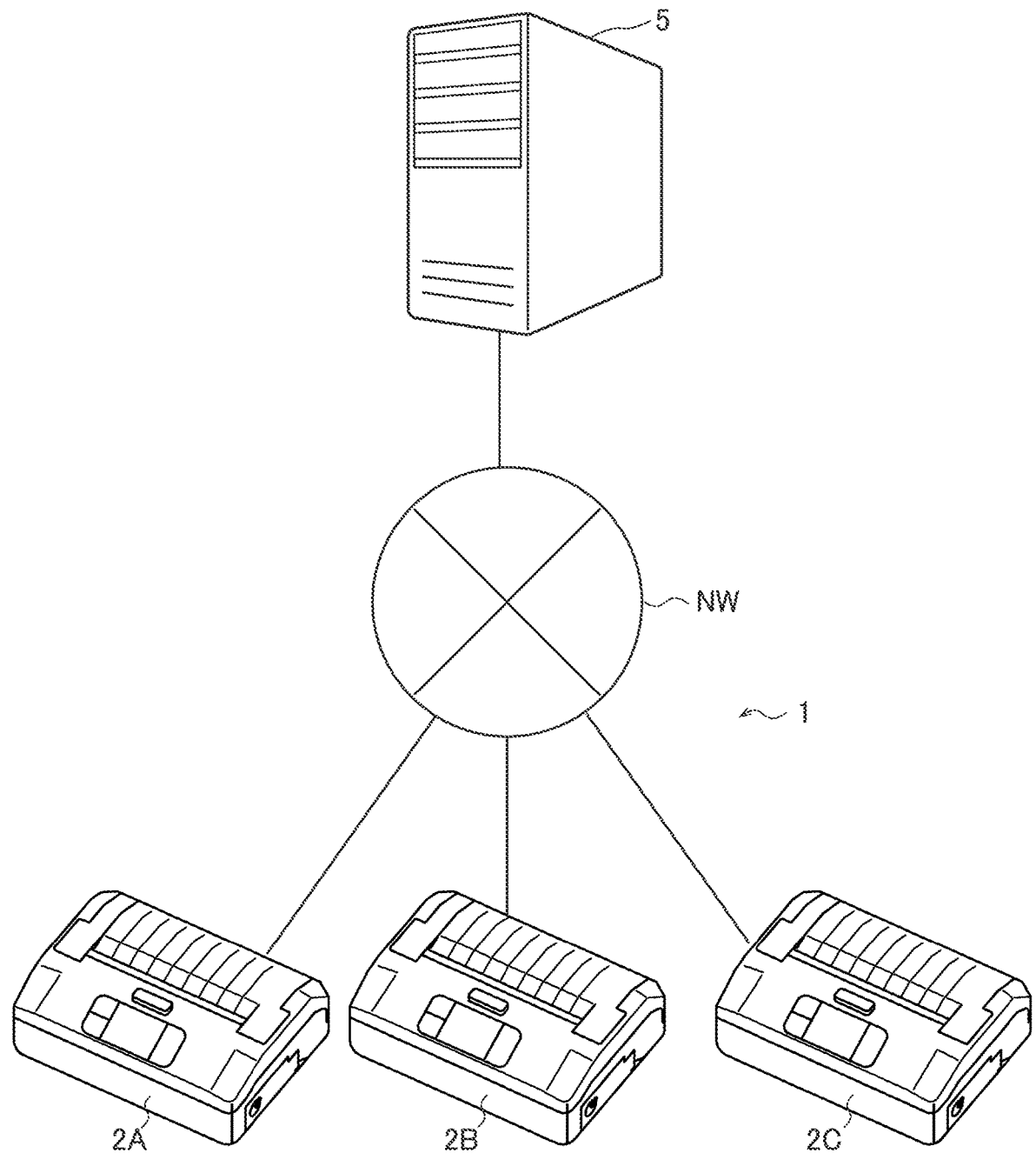
FIG. 8 shows an overview of system configuration of an information processing system according to a second embodiment.
Figure 9:
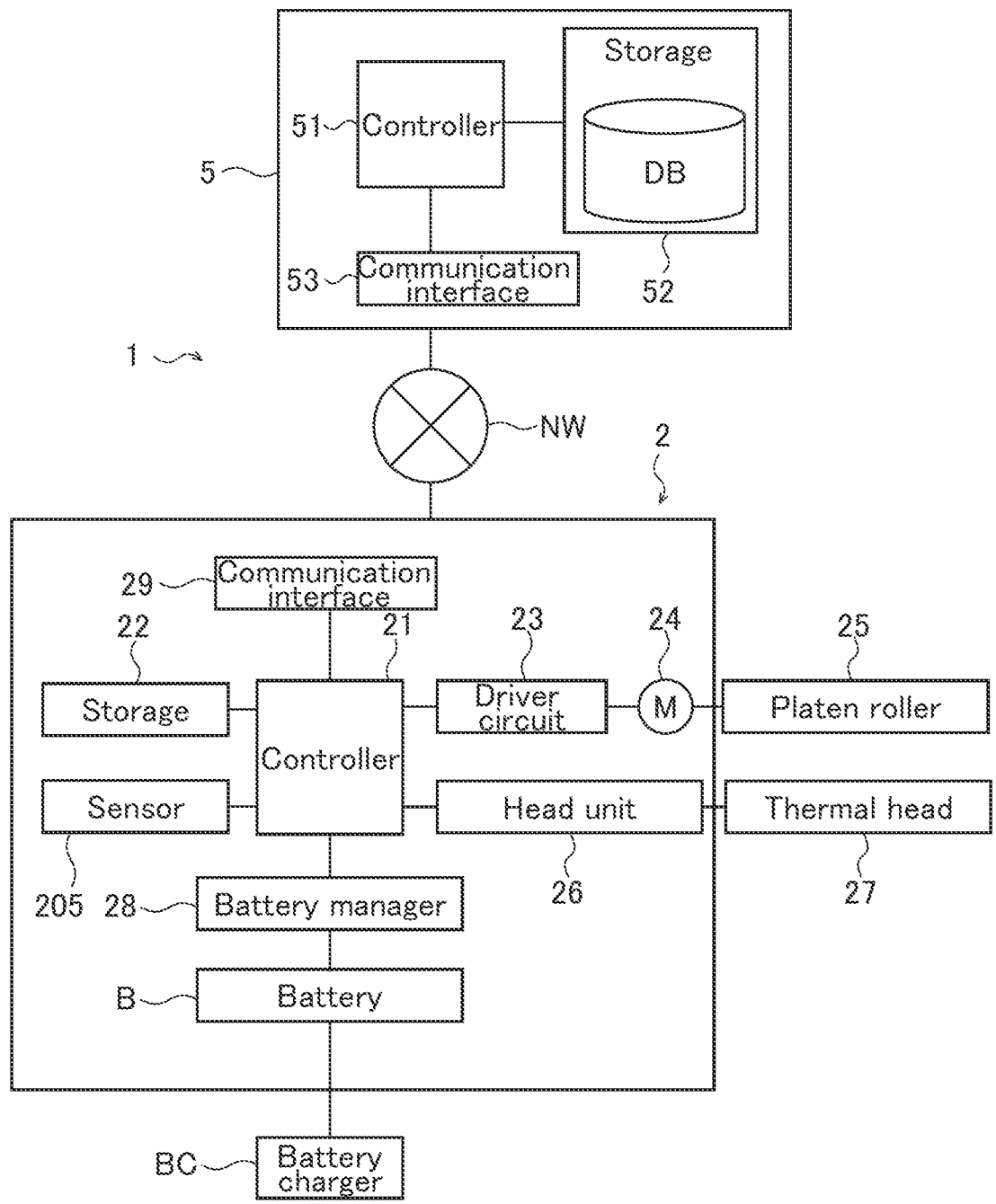
FIG. 9 is a block diagram to represent internal configuration of each device of the information processing system according to the second embodiment.

FIG. 8 shows an overview of system configuration of an information processing system 1 according to the present embodiment. FIG. 9 is a block diagram to represent internal configuration of each device of the information processing system 1 according to the present embodiment. FIG. 10 shows an example of a printer database in the information processing system 1 according to the present embodiment.

As shown in FIG. 8, the information processing system 1 according to the present embodiment includes a plurality of printers 2A, 2B, 2C and a server 5. Each printer is capable of communicating with the server 5, through a network NW such as a local area network (LAN), a wide area network (WAN), or Internet. Each of the plurality of printers 2A, 2B, 2C has the same configuration as the printer 2 of the first embodiment. The printers 2A, 2B, 2C are collectively represented by "printer 2" when things common to the printers are referred to in the following description. It should be noted that the exemplary system configuration illustrated in FIG. 8 is not intended to limit printers centrally managed by the server 5, to ones having the same internal configuration.

As the internal configuration of the printer 2 in FIG. 9 is the same as that shown in FIG. 4, redundant explanation for the internal configuration will be omitted here.

As shown in FIG. 9, the server 5 includes a controller 51, a storage 52, and a communication interface (I/F) 53. The communication interface (communication I/F) 53 (an exemplary second communication part) has a communication circuit for communicating with the printer 2.

The controller 51 is comprised of a microcomputer and memories (namely, a RAM and a ROM) to control operations of the server 5. The microcomputer loads a program from the ROM when the server 5 is powered on, and executes the program.

The storage 52 is a storage device such as a hard disk drive (HDD). The storage 52 is configured to store a printer database, which is shown in FIG. 10 for example, in order to centrally manage the printers 2 connected to the server 5.

As shown in FIG. 10, the printer database includes information of a cumulative number of platen roller rotations and battery status information, for a printer ID that identifies each printer 2.

The printer ID is information for identifying each printer 2, and may be a serial number, a manufacturing number, etc. In an example of the present embodiment, printer IDs: A001, B002, C003 correspond to the printers 2A, 2B, 2C respectively.

Each of the information of a cumulative number of platen roller rotations and the battery status information has the latest values and a previous values. When receiving, from each printer 2, a value of information of a cumulative number of rotations of the platen roller and a value of the battery status, the controller 51 updates the printer database such that the latest values are written in the previous record and then the received values are written in the newly latest record.

Functions realized by execution of the program in the controller 51 includes at least the following functions (i) to (iii):

(i) Obtaining, from each printer 2, battery status information of the battery B, information related to a cumulative number of platen roller rotations, and information related to a number of platen roller rotations for a single business form (which are collectively referred to as "printer information");

(ii) Updating the printer database; and (iii) Computing a number-of-forms-issuable of business forms with remaining battery capacity of the battery B of each printer 2, and notifying each printer 2 of the number-of-forms-issuable.

(2-2) Behavior of Information Processing System

Figure 11:
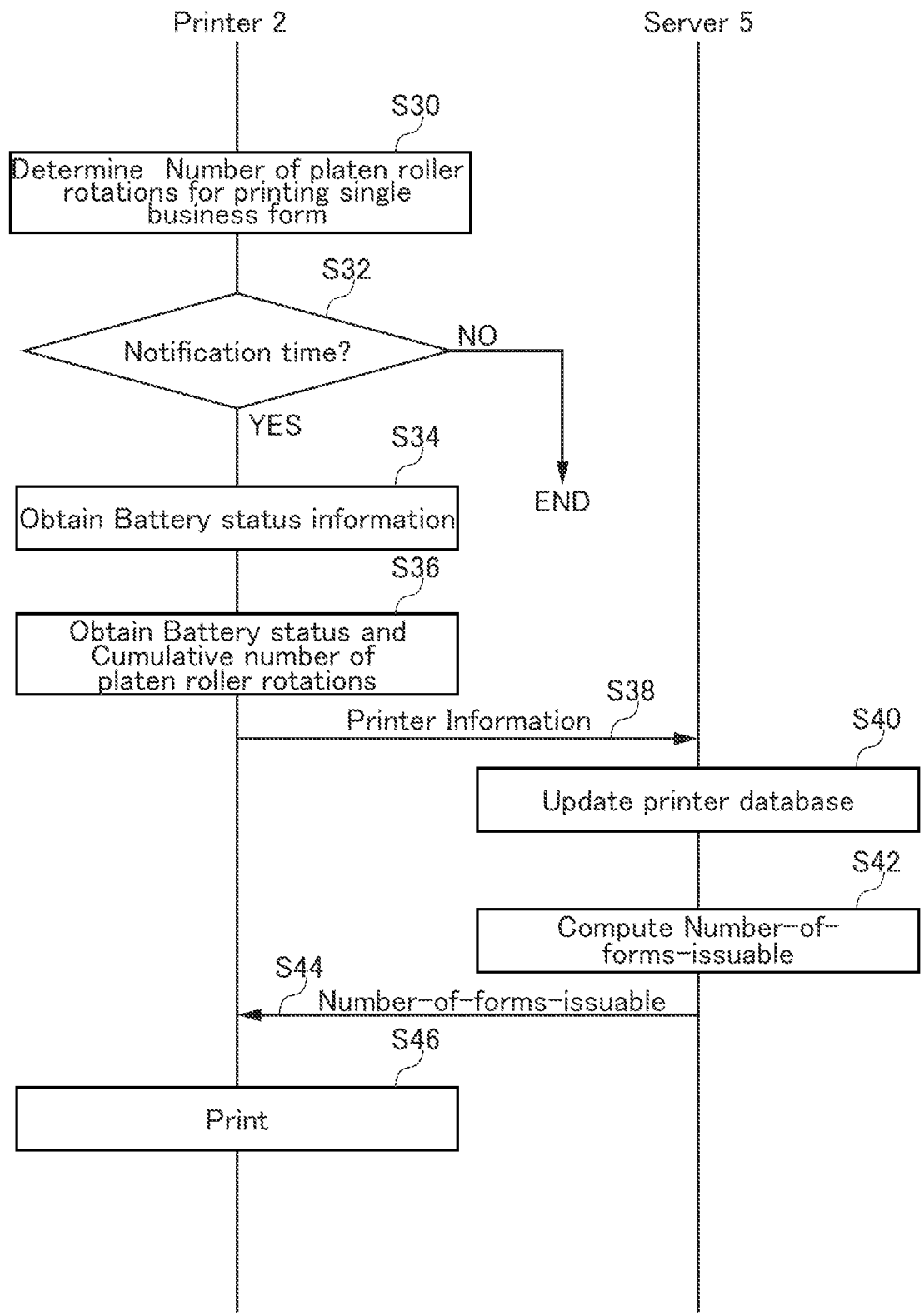
FIG. 11 shows a sequence chart showing an exemplary behavior of the information processing system according to the second embodiment.

Next, an exemplary behavior of the information processing system 1 according to the present embodiment will be described with reference to FIG. 11. FIG. 11 shows a sequence chart showing an exemplary behavior of the information processing system 1 according to the present embodiment. In FIG. 11, a sequence of instructions for the printer 2 is mainly executed by the controller 21, while a sequence of instructions for the server 5 is mainly executed by the controller 51.

According to the example shown in FIG. 11, the printer 2 notifies the server 5 of printer information, at a time in the operation period in which the charger BC is not connected to the printer 2, or at a freely determined time. The server 5 updates the printer database based on the notified information, and transmits to the printer 2, as a response, information about a number-of-forms-issuable of the printer 2.

In FIG. 11, the printer 2 invariably determines a number of platen roller rotations for a single business form (step S30). The number of platen roller rotations for a single business form should be constant, as long as a type of the paper roll R applied is not changed. Thus, the number of platen roller rotations for a single business form may be determined at least once during the operation period.

At a time when the printer 2 notifies the server 5 of printer information (step S32: YES), the printer 2 obtains battery status information of the battery B from the battery manager 28 (step S34), and then obtains information related to a cumulative number of platen roller rotations (step S36). As information for a cumulative number of platen roller rotations is sequentially recorded in the storage 22, the controller 21 obtains the information for the cumulative number of platen roller rotations from the storage 22.

The printer 2 transmits, to the server 5, the printer information which has been obtained at the steps S30 to S32 (step S38).

The server 5 updates records of the printer database such that the information received at the Step S38 becomes the latest values, and a record which had been the latest before receiving the information becomes a previous record (step S40). The server 5 then computes a number-of-forms-issuable for the printer 2, based on records having the latest values and the previous values in the printer database, and data of the number of platen roller rotations for a single business, which have been received at the step S38.

The computing method for the number-of-forms-issuable may be the same as described in the first embodiment. Note that, in the present embodiment, SOCs in the previous values and the latest values in the printer database correspond to CR1 and CR2 in the equation (2) described above, and the threshold Till for a lower limit of the SOC of the battery B is known by the server 5. A number N of platen roller rotations is found by a difference between a previous value and the latest value for the cumulative number of the platen roller rotations.

The server 5 transmits, to the printer 2, information for the number-of-forms-issuable, which have been computed at the step S42 (step S44), and the printer 2 prints the received information for the number-of-forms-issuable (step S46). Note that, when equipped with a display part, the printer 2 may display the information for the number-of-forms-issuable, which have been received at the step S44.

In the step S46, the printer 2 may print the battery status information of the battery B, which has been obtained at the step S34, in addition to the information for the number-of-forms-issuable, as shown in FIG. 7.

The embodiments of the present invention have been described in details. However, scope of the present invention is not limited to the aforementioned embodiments described above. The aforementioned embodiments may be improved or modified in a variety of ways to such an extent that does not depart from the spirit of the present invention.

For example, it has been described in the first embodiment that, a number-of-forms-issuable is computed, assuming that a relation between SOC of the battery and a number of the business forms that have been issued is linear; however, the present invention is not limited to this computation method. The relation may be defined to be nonlinear in line with actual situation, and a number-of-forms-issuable may be computed based on the nonlinear relation.

In the aforementioned embodiments, it has been described that, a decrease rate in remaining battery capacity of the battery relative to a number of the business forms that have been issued, is computed in each time; however, the present invention is not limited to this computation method. The decrease rate may be preliminarily measured, and a number-of-forms-issuable may be computed based on the measured decreased rate as a fixed value.

The invention claimed is:

1. A printer for issuing a print medium, comprising:
   a rechargeable battery configured to supply power to the printer;
   a feed roller configured to feed the print medium;
   a motor configured to drive the feed roller;
   a printing part configured to print information on the print medium; and
   a controller configured to determine, at a present time, a number of print media on which the printing part can print during an operating period of time, with present remaining battery capacity of the battery, the operating period of time being a period of time during which the battery is disconnected from a battery charger, or a period of time beginning when the battery is disconnected from the battery charger and ending when a user performs a manipulation of the printer,
   wherein the controller is configured to determine the number of print media by performing steps comprising:

computing a number of print media that have been issued during a first period of time based on a number of rotations of the motor during the first period of time, the first period of time being before the present time during the operating period of time;

computing a decrease rate of remaining battery capacity of the battery during the operating period of time, based on information related to variation of remaining battery capacity of the battery during the first period of time and the number of print media that have been issued during the first period of time, and determining the number of print media on which the printing part can print during the operating period of time, based on the decrease rate.

2. The printer according to claim 1, wherein the printing part is configured to print information related to the number of print media determined by the controller, on the print medium.

3. The printer according to claim 1, further comprising a display part configured to display information related to the number of print media determined by the controller.

4. The printer according to claim 1, further comprising a communication part configured to transmit to an outside device, information related to the number of print media determined by the controller.

5. The printer according to claim 1,
wherein the controller is configured to obtain from the battery at least one piece of information including:
information related to a number of charging to the battery;
information related to a capacity recovery rate of the battery;
information related to a maximum temperature of the battery to date; and
information related to the number of print media, and
wherein the printing part is configured to print the at least one piece of information obtained by the controller, on the print medium.

6. The printer according to claim 1,
wherein the controller is configured to obtain from the battery at least one piece of information including:
information related to a number of charging to the battery;
information related to a capacity recovery rate of the battery;
information related to a maximum temperature of the battery to date; and
information related to the number of print media, and
wherein the printing part is configured to print the at least one piece of information obtained by the controller, on the print medium.

7. The printer according to claim 1, wherein
the print media is a belt-shaped long strip of continuous paper on which location detection marks are formed with predetermined intervals;
the printer further comprises a sensor configured to detect each of the location detection marks; and
the step of computing the number of print media comprises computing the number of print media that have been issued during the first period of time, based on the number of rotations of the motor during the first period of time and on a number of rotations of the motor while the feed roller feeds a distance of the continuous paper between adjoining location detection marks.

8. A non-transitory computer-readable recording medium that includes a program executed in a printer that operates with power from a rechargeable battery and issues a print medium, the printer comprising a feed roller configured to feed the print medium and a motor configured to drive the feed roller, the program being configured to cause a computer to function to:
instruct to print information on the print medium, and
determine, at a present time, a number of print media on which the printer can print during an operating period of time, with present remaining battery capacity of the battery, the operating period of time being a period of time during which the battery is disconnected from a battery charger, or a period of time beginning when the battery is disconnected from the battery charger and ending when a user performs a manipulation to the printer, wherein determining the number of print media comprises:
computing a number of print media that have been issued during a first period of time based on a number of rotations of the motor during the first period of time, the first period of time being before the present time during the operating period of time;
computing a decrease rate of remaining battery capacity of the battery during the operating period of time, based on information related to variation of remaining battery capacity of the battery during the first period of time and the number of print media that have been issued during the first period of time, and
determining the number of print media on which the printing part can print during the operating period of time, based on the decrease rate.

9. An information processing system including a server and a printer, the printer being capable of communicating with the server and issuing a print medium,
wherein the printer comprises:
a rechargeable battery configured to supply power to the printer;
a feed roller configured to feed the print medium;
a motor configured to drive the feed roller;
a printing part configured to print information on the print medium;
a first communication part configured to transmit to the server,
information related to present remaining battery capacity of the battery and
information related to variation of remaining battery capacity of the battery during a first period of time and a number of print media that have been issued during the first period of time, the first period of time being before a present time during an operating period of time, the operating period of time being a period of time during which the battery is disconnected from a battery charger, or a period of time beginning when the battery is disconnected from the battery charger and ending when a user performs a manipulation to the printer; and
a printer controller configured to compute the number of print media that have been issued during the first period of time based on a number of rotations of the motor during the first period of time, and
wherein the server comprises:
a server controller configured to determine, at the present time based on the information transmitted, a number of print media on which the printing part can print during the operating period of time, with the present remaining battery capacity of the battery; and
a second communication part configured to transmit to the printer, information related to the number of print media on which the printing part can print during the operating period of time, as determined by the server controller, wherein the server controller is configured to determine the number of print media by performing steps comprising:

computing a decrease rate of remaining battery capacity of the battery during the operating period of time, based on the information from the printer, and determining the number of print media on which the printing part can print during the operating period of time, based on the decrease rate.

* * * * *